April 2, 1957
J. PALSULICH ET AL
2,787,503
JOURNAL AND BEARING COMBINATION TO
MINIMIZE FRETTING CORROSION
Filed May 17, 1954
FIG. 1
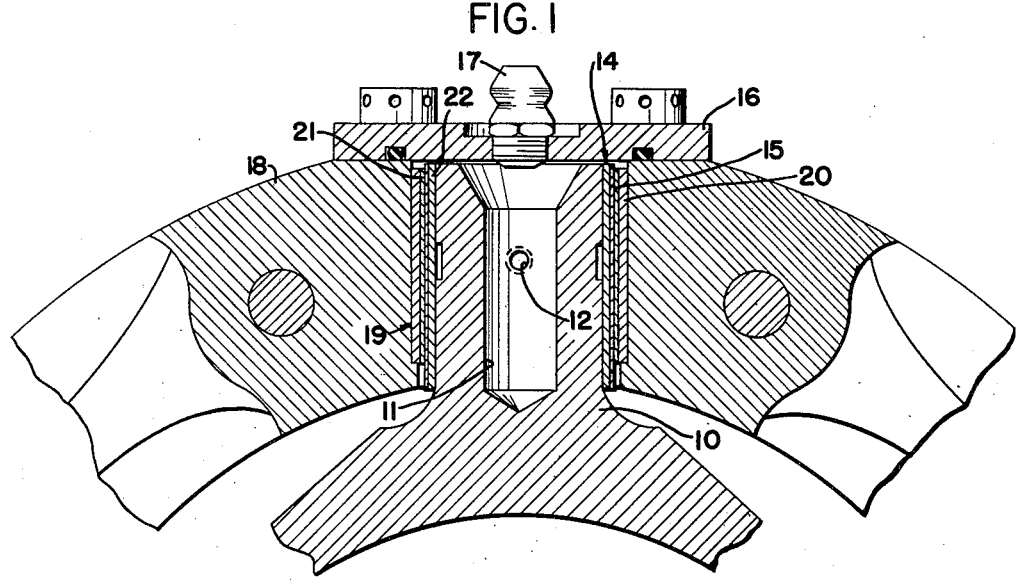
FIG. 3
FIG. 2
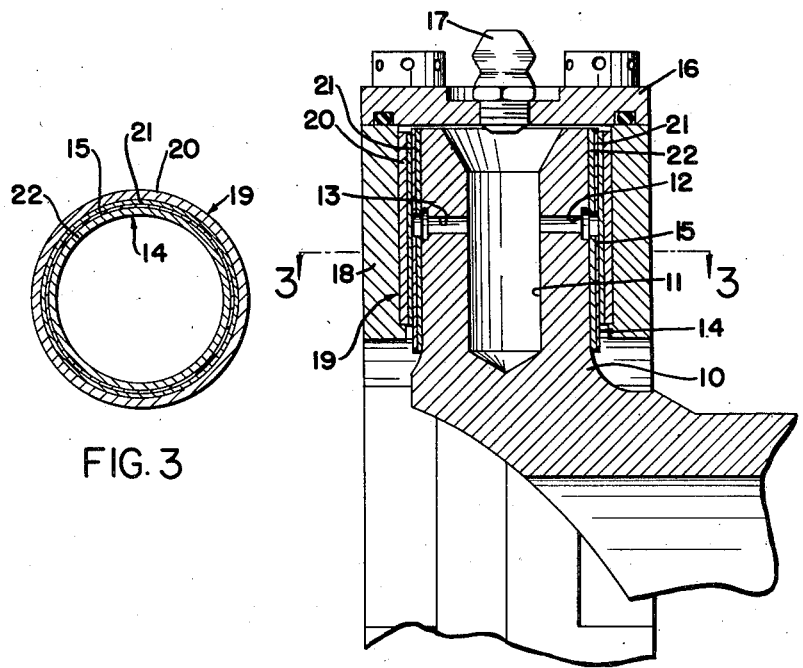
INVENTORS
JOSEPH PALSULICH &
BY JAMES R. FOTHERINGHAM
Fay & Fay
ATTORNEYS

United States Patent Office

2,787,503
Patented Apr. 2, 1957

2,787,503

JOURNAL AND BEARING COMBINATION TO MINIMIZE FRETTING CORROSION

Joseph Palsulich, Lyndhurst, and James R. Fotheringham, Willowick, Ohio, assignors to Clevite Corporation, Cleveland, Ohio, a corporation of Ohio Application May 17, 1954, Serial No. 430,172

4 Claims. (Cl. 308—241)

This application, relating as indicated to bearings, is more particularly directed to a journal and bearing combination for fretting corrosion. This invention has a journal and bearing, one of which members is loaded and the other of which is a load receiving member, said members being adapted to rotate, slide, or oscillate with respect to one another. One of said members has, at least on a contacting surface thereof, a coating of molybdenum. The mother of said members is copper or a high copper-containing alloy in direct contact with the molybdenum coated member.

The particular problem this combination is designed to overcome is fretting corrosion. Fretting corrosion is also known as false brinelling or friction oxidation, and is a type of surface failure occurring when fitted surfaces are subjected to vibratory, oscillating, or other types of relative motion. The surface then becomes characterized by removal of the material, or pitting, in the area of contact. It has been hypothesized that protective oxide coatings are successfully removed from surfaces by frictional forces created by vibration and slipping of the surfaces in contact. It has also been hypothesized that the frictional heat resulting from severed cohesion bonds is responsible for the accelerated action of fretting corrosion. Regardless of the reason, this combination of materials produces surprising results in the elimination of fretting corrosion, particularly under conditions of zero or marginal lubrication. The latter is sometimes referred to as boundary film lubrication.

An object of this invention is to produce a combination of materials, whether in a bearing or a journal, which will reduce or eliminate fretting corrosion.

A further object of this invention is to produce a combination of materials which will, under the most severe lubricating conditions, operate satisfactorily without welding of the low temperature material and the high temperature material. Said low temperature material is normally the bearing and said high temperature material is normally the journal, but can be interchanged.

To the accomplishment of the foregoing and related ends, said invention, then, consists of the means hereinafter fully described and particularly pointed out in the claims, the following description setting forth in detail one approved method of carrying out the invention, such disclosed method, however, constituting but one of the various ways in which the principles of the invention may be used.

In the drawings:

Fig. 1 is a fragmentary cross-sectional view through a driving ring assembly;

Fig. 2 is a view perpendicular to Fig. 1 through the assembly; and

Fig. 3 is a cross-sectional view along the line 3—3 of Fig. 2, showing the bushing and molybdenum insert on the pin only.

In the specification when we say bearing we mean a support or carrier in which a shaft, journal, pin, pivot, or the like, turns, slides, revolves, or oscillates with a minimum of friction.

However, for convenience, the specification and claims may refer to "bearing" in the generic sense, and refer to "bushing" as well, and in this sense it includes the contact between one member and another member involving a rubbing surface, regardless of the amplitude of the relative movement.

Further, in this specification, when we refer to "loaded" we mean that the load may be only that of the weight of the bearing or journal, and need not have an external load applied thereto.

In connection with copper-containing alloys, particularly high copper-containing alloys, it is understood that this may include pure copper.

When the rubbing action between materials is referred to, that sometimes produces fretting corrosion, this vibration or oscillation may be almost imperceptible, and is meant to be included in the definition of rubbing, even though this motion is for all purposes not apparent to the naked eye.

When we refer to "molybdenum" we may include molybdenum oxide in various portions, or a combination, dependent upon the method used in applying the same.

Today in industry there are a great number of problems of fretting corrosion. Fretting corrosion is a surface failure occurring when two surfaces are subjected to sliding, vibratory, or oscillating motion. Occasionally it is also known under the names of false brinelling or friction oxidation. The surface is characterized by material removal and pitting of the area of contact, as has been stated above, and the production of oxide debris or galling, together with seizing, cracking, or fatigue of the material, loss of dimensional tolerances in accurately fitted parts, and loosening of bolted or clamped surfaces. The pits and cracks common to this type of corrosion are actually stress concentration points which eventually load to fatigue failure.

There are perhaps at least three theories for the cause of this corrosion, and, briefly, one theory is that the protective oxide coatings are successively removed from the surfaces by the frictional forces created by vibration and slipping of the surfaces in contact. The process continues on the newly exposed surface, resulting in pits. Still another theory is that the frictional heat resulting from the severed cohesion bonds is responsible for the accelerated action of fretting corrosion. Some believe that oxidation is actually the secondary effect along with vibratory motion and high sliding speeds. A third theory is that the intermolecular forces at the interface result in the pulling or jerking away of small particles of one or both materials from the parent materials. These particles are then quickly oxidized. It is not, however, believed that electrochemical corrosion is involved in the process. Examples of some products which have fretting corrosion problems are the following: bearing backs, outer and inner races of anti-friction bearings, king-pin bushings, and spline shafts.

To remedy this problem, a covering of molybdenum has been provided either on a shaft, i. e., the journal, or on a housing, such as a bearing. One or the other member could be loaded, but not necessarily. For example, the shaft might be loaded in the housing, and the housing would be a bearing. This particular bearing must be a high copper-containing alloy, but the reverse could be true, and the housing might be coated with molybdenum and the shaft have a copper coating. For example, in the drawings there is an illustration, only by way of example, of a drive shaft coupling ring assembly having a housing and a straight bushing therein. There is shown a pin member 10 having shrunk on the pin a steel sleeve, the outer surface of which, up to a thickness of .005 inch, is covered continuously with a metallized surface of molybdenum. Coatings of molybdenum applied by other means may be provided and the thickness could be considerably more or less than this, if it was believed to be desirable. In the center of the pin at 11 is an opening for lubricant, and the lubricant feeds to the journal through openings 12 and 13. There is a suitable opening in the molybdenum coated steel sleeve. Said sleeve is shown at 14 and has the outer covering of molybdenum indicated at 15, and a steel back 22. Some type of top plate 16 is shown with a grease fitting 17. The coupling ring has a steel housing 18 and has fitted therein a copper containing bushing 19, said bushing having a steel back 20 and copper layer 21. The steel sleeve has molybdenum on the outer surface thereof, and the copper-containing bushing is in friction contact with it.

This particular combination of materials is cited only by way of example, as it is known that the combination of materials would be useful also in other types of bearing and bushing applications, such as railway journal bearings, face type and ring seals and the like.

For convenience, the steel sleeve is press fitted onto the pin and before press fitting is coated as by metallizing on the outer surface thereof. It will be appreciated that the pin could be of all molybdenum if it had sufficient strength, or any portion of the outer surface could be coated with molybdenum. By preference, metallizing is chosen to coat a steel shaft and, generally, about .005 inch of molybdenum is sufficient for the purpose. The other portion of this journal and bearing combination would be a high copper-containing alloy, as for example, one having a content of 10% tin, 10% lead, and the balance copper, or perhaps one having about 3% tin, about 23% lead, 72% copper, and on the low lead side, one having 4% tin, 8% lead, 3% zinc, balance copper, would be satisfactory. By way of inclusion, it is meant that the copper content may vary from 72% to 100%, the tin from 3% to 10%, the lead from 8% to 23%, and the zinc up to 3%.

This particular combination of materials is particularly effective in resisting fretting corrosion because the molybdenum and copper-containing alloys in contact with one another under the conditions that normally produce corrosion, do not weld. It is further believed that certain other conditions in journal and bearing combinations are also eliminated because the coating of molybdenum on the shaft prevents the penetration of the copper into the shaft. If the shaft is of steel it may in time break because the steel has crystallized or embrittled.

Thus it is seen that this combination of materials produces a superior result to solve a problem in fretting corrosion, and in the combination of a loaded and a load receiving member which are moving relative to each other. It is also a new method of overcoming fretting corrosion and of supporting a shaft.

The invention may be embodied in other specific forms without departing from the spirit or essential characteristics thereof, and the present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. A combination journal and bearing, one of which members is loaded and the other of which is a load receiving member, said members being in rubbing contact with one another, one of said members having on the contacting surface thereof at least a thin coating of molybdenum, the other of said members having at least on the contacting surface thereof a copper-containing alloy.

2. A journal and bearing combination comprising a loaded member and a load receiving member, said members being in rubbing contact, one of said members having at least on the outer surface thereof a layer of molybdenum, the other of said members having at least on the inner surface thereof a high copper-containing alloy, said members being in frictional contact one with the other.

3. A combination of claim 1 in which the copper-containing layer has from 72% to 85% copper, from 3% to 10% tin, and from 8% to 23% lead.

4. The combination of claim 1, in which a thin uniform layer of molybdenum about .005 inch, is bonded to a steel sleeve to form one of said loaded and load receiving members, the other of said members having a high copper-containing alloy layer securely bonded to a strong backing material, said copper-containing alloy layer being relatively thin.

References Cited in the file of this patent

UNITED STATES PATENTS

| | | |
|---|---|---|
| 1,945,294 | Pike et al. | Jan. 30, 1934 |
| 2,622,993 | McCullough et al. | Dec. 23, 1952 |

OTHER REFERENCES

Lubrication Engineering, pages 293, 294, 313, 314, December 1952.